June 6, 1950  J. ROEHRIG  2,510,418
VEHICLE SPRING SUSPENSION
Filed Sept. 17, 1949

Inventor
John Roehrig
By William J. Ruano
Attorney

Patented June 6, 1950

2,510,418

UNITED STATES PATENT OFFICE 2,510,418

VEHICLE SPRING SUSPENSION

John Roehrig, Pittsburgh, Pa.

Application September 17, 1949, Serial No. 116,324

6 Claims. (Cl. 267—47)

This invention relates to a spring suspension for a vehicle, such as an automobile, bus, truck or trailer and, more particularly, to a leaf spring eye construction which will prevent breakage of the spring as the result of severe braking of the vehicle.

In a conventional type of vehicle spring suspension having a forward shackle and a rearward loop or eye of the main leaf encircling a stationary pin, there is a great tendency, when the brakes are applied, for the eye portion of the spring, due to its unwinding action, to open to such an extent as to cause breakage thereof. This, of course, necessitates the expense of replacement of the spring and puts the automobile out of use during the time necessary for such replacement. Even though an additional eye formed at the end of an adjacent leaf or wrapper is oftentimes snugly encircled about the first mentioned eye and wrapped in the same direction, such additional eye affords little or no protection because it too tends to open up or unwind as the result of application of the brakes and thereby gives no appreciable back-up support of the main leaf eye.

An object of the present invention is to provide a novel spring suspension for a vehicle, which suspension has a novel leaf spring eye construction which will overcome the above mentioned disadvantages of conventional leaf spring eye constructions.

A more specific object of the invention is to provide a novel spring suspension for a vehicle having a main leaf spring eye wound in such direction and which may be encircled by the eye of a wrapper leaf which is wound therearound in a manner so as to avoid breakage of the main leaf eye even when excessive braking forces are applied to the vehicle brakes or excessive deflection of the springs is encountered due to loading or otherwise.

Figure 1:
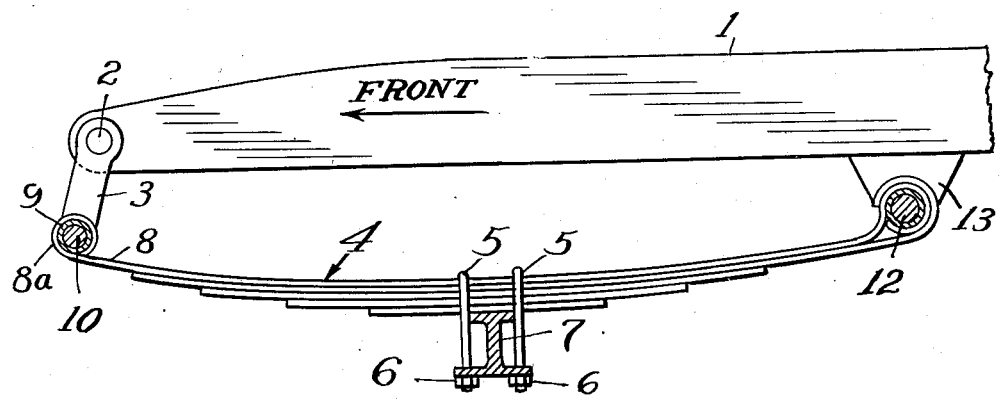
Figure 2:
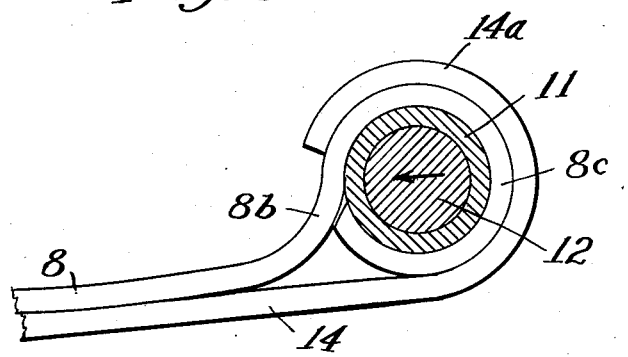

Other objects and advantages of my invention will become apparent from a study of the following specification and the accompanying drawing wherein:

Fig. 1 is a side elevation of a vehicle underframe portion showing a spring suspension having the leaf spring eye construction embodying the principles of the present invention, and Fig. 2 is a fragmentary, enlarged side elevational view of the spring illustrated in Fig. 1 and more clearly showing the novel eye construction of the spring leaves.

Referring more particularly to Figs. 1 and 2 of the drawing, numeral 1 denotes a frame portion of a vehicle, the forward direction of movement of which vehicle is indicated by the arrow. Pivotally mounted forwardly of the frame portion about a transverse axis 2 formed by a shackle bolt, is a shackle or link 3 extending in substantially a vertical direction. A spring assembly 4, which may be of half elliptical shape with its concave side facing upwardly, or of any other similar shape, is fastened by means of U bolts or clips 5 and nuts 6 to a wheel supporting member or axle 7 extending transversely of the vehicle. The leaves of spring 4 assembly may be made of any suitable material, such as silico-manganese spring steel, or other suitable metal or alloy. The point of connection of the spring assembly to the axle is half-way or substantially half-way of the length of the spring assembly. The upper or main leaf 8 of the spring assembly has its forward end 8a bent in a clockwise direction in the form of an eye about a bushing 9 which, in turn, snugly encircles a pivotal pin 10. The main or tie leaf 8 has a reversely bent rear portion 8b and terminates in an eye 8c wound in a clockwise direction and snugly encircling a bushing 11 of bronze or any other suitable material. The bushing is fitted closely around a pin 12 which is supported on a rearward spring supporting bracket or hanger 13. In conventional types of vehicle spring suspensions eye 8c is wound in an opposite direction, thereby having the disadvantages described hereinbefore. An additional leaf 14 of the spring assembly may be employed as a wrapper or safety leaf inasmuch as its end portion 14a is snugly wound about the eye 8c.

It will be understood that Fig. 1 illustrates only one of the longitudinally extending spring suspensions of a vehicle, there being a spring suspension of identical construction on the opposite side of the vehicle. Furthermore, these identical constructions may be either at the rear end of the vehicle or at the forward end thereof.

In operation, let it be assumed that the vehicle is travelling in a forward direction, as indicated by the arrow, and that the brakes are suddenly applied. The movement of axle 7 would then tend to become arrested, whereas the frame tends to continue to move in the direction indicated by the arrow due to its inertia. Consequently, the pin 12 which is stationarily mounted with respect to the frame will exert a force in the same direction, and parallel to the direction of the arrow. Consequently, the spring, which is tied to the axle, will tend to be held stationary thereby while pin 12 presses against the reverse bend 8b of the main leaf, in the direction indicated by the small arrow in Fig. 2, thereby causing further reverse bending of 8b and a slight wind-up of the end portion or eye 8c. Thus there will be no tendency to break the eye 8c as would have been the case had the eye been wrapped around the bushing in an opposite direction as in conventional spring suspensions. The force exerted by pin 12 on bushing 11 will have a tendency to push the extreme end of eye 8c against the reversely bent portion 8b.

Since eye 14a of wrapper leaf 14 is wound in an opposite direction from the main leaf eye 8c wrapper leaf 14 is longer than leaf 8 it will have a tendency to unwind and tighten its end portion about eye 8c as the result of said aforesaid excessive braking of the vehicle. Therefore, it will provide a back-up leaf portion which will tend to creep towards the reversely bent portion 8b of the main leaf spring 8 so as to resist the tendency of portion 8b to become more reversely bent to an abnormal extent. The oppositely wound eyes 8c and 14a, therefore, cooperate in a manner to prevent excessive bending and breakage of the main leaf spring eye.

The above described operation occurs not only as a consequence of sudden, excessive braking of the vehicle, but as the result of heavy loading or other factors which cause straightening out of the spring assembly 4.

Thus it will be seen that I have provided a novel and efficient spring suspension for a vehicle, having a leaf spring eye construction arranged in such manner as to avoid the common tendency of breakage of the eyes resulting from excessive braking of the vehicle and the like.

While a wrapper leaf 14 is shown in cooperation with the main leaf, it will be understood that such wrapper leaf may be omitted, if desired, in which case the main leaf, by virtue of the reverse bend of its end portion and of the fact that its eye is wound in an opposite direction from the conventional direction of wind, will itself be relatively free of breakage inasmuch as braking of the vehicle causes winding instead of unwinding thereof.

While I have illustrated and described certain specific embodiments of my invention, it will be understood that these are by way of illustration only, and that various changes and modifications may be made within the contemplation of my invention and within the scope of the following claims.

I claim:

1. In a spring suspension for a vehicle, a frame member, a wheel supporting axle, a longitudinally extending leaf spring assembly secured at an intermediate point to said axle, a shackle pivotally mounted at the forward end of said frame member with its lower end secured to a forward end portion of said spring assembly, a hanger secured to a rearward portion of said frame member and having a transversely extending pin supported thereby, the main leaf of said spring assembly having a reversely bent rear portion extending above the said main leaf and terminating in an eye wrapped about said pin in a direction opposite to that of the reverse bend and in a clockwise direction, as viewed from the side of the vehicle, so that excessive braking of the vehicle will cause greater reverse bending of said reversely bent portion and wind-up of said eye.

2. A spring suspension as recited in the preceding claim wherein said spring assembly includes a secondary leaf having a rear end portion looped snugly about said eye to form a protective backing therefor and being wound in a direction opposite to that of the rear eye of said main leaf.

3. In a spring suspension for a vehicle, a frame member, a wheel supporting axle, a longitudinally extending leaf spring assembly secured at an intermediate point to said axle, one end of the main leaf being relatively movable with respect to same frame member and the other being wrapped about a pin fixed with respect thereto, said spring assembly including a main leaf having a reversely bent end portion terminating in an eye curved oppositely to said reversely bent end portion and wrapped about said pin such that braking of the vehicle will tend to effect wind-up thereof, said last mentioned end portion of said spring assembly including a wrapper leaf eye looped snugly and in an opposite direction to the curvature of the last mentioned eye of said main leaf so as to provide a back-up layer which will tend to unwind and become tightened onto said main leaf eye when excessive braking pressure is applied to the vehicle so as to resist the tendency of excessive deflection of the reversely bent portion of said main leaf and prevent breakage of the main leaf eye.

4. A vehicle suspending, leaf spring assembly comprising a main leaf and a wrapper leaf, an end portion of said main leaf having a reverse bend extending above the main leaf and terminating in an eye wound in a direction opposite to said reverse bend, the corresponding end portion of the wrapper leaf terminating in an eye wound snugly about and in the opposite direction of wind of the main leaf spring eye.

5. A vehicle multi-leaf spring unit comprising a main leaf having an eye at each of its longitudinal extremities, both of said eyes extending upwardly of said main leaf and having centers extending in substantially the same horizontal plane, the rearmost of said eyes being bent in a clockwise direction as viewed from the outwardly exposed side of the spring unit and being integrally formed on a reversely bent rear end portion of the main leaf which is bent in an opposite direction to the curvature of the rear eye so that the rearmost eye will tend to wind up when mounted on a vehicle and excessive braking pressure is suddenly applied.

6. A vehicle multi-leaf spring unit comprising a main leaf having an eye at each of its longitudinal extremities, the end portion of said main leaf to be mounted rearmost of the vehicle being reversely bent upwardly of said main leaf and its extremity being curved in an opposite direction to form the rear eye, said rear eye being bent in a clockwise direction as viewed from the side of the vehicle to form the eye so that excessive braking will cause greater reverse bending of said reversely bent portion and wind-up of said eye.

JOHN ROEHRIG.

REFERENCES CITED

The following references are of record in the file of this patent:

UNITED STATES PATENTS

| Number | Name | Date |
|---|---|---|
| 1,799,880 | Arcand | Apr. 7, 1931 |
| 1,900,841 | Nilsson | Mar. 7, 1933 |
| 2,041,159 | Wallace | May 19, 1936 |

FOREIGN PATENTS

| Number | Country | Date |
|---|---|---|
| 247,074 | Great Britain | Feb. 11, 1926 |
| 745,689 | France | Feb. 21, 1933 |